US011238658B2

(12) United States Patent
Driancourt

(10) Patent No.: US 11,238,658 B2
(45) Date of Patent: Feb. 1, 2022

(54) AR SPACE IMAGE PROJECTING SYSTEM, AR SPACE IMAGE PROJECTING METHOD, AND USER TERMINAL

(71) Applicant: KABUSHIKI KAISHA SQUARE ENIX, Tokyo (JP)

(72) Inventor: Remi Driancourt, Tokyo (JP)

(73) Assignee: KABUSHIKI KAISHA SQUARE ENIX, Tokyo (JP)

(\*) Notice: Subject to any disclaimer, the term of this patent is extended or adjusted under 35 U.S.C. 154(b) by 0 days.

(21) Appl. No.: 16/851,310

(22) Filed: Apr. 17, 2020

(65) Prior Publication Data
US 2020/0334910 A1 Oct. 22, 2020

(30) Foreign Application Priority Data

Apr. 19, 2019 (JP) .............................. JP2019-079878

(51) Int. Cl.
*G06T 19/00* (2011.01)
*G06T 7/50* (2017.01)

(52) U.S. Cl.
CPC .............. *G06T 19/006* (2013.01); *G06T 7/50* (2017.01); *G06T 2207/10028* (2013.01)

(58) Field of Classification Search
CPC .......... G06F 2111/18; G06F 3/011–015; G06F 3/0481; G06F 3/04817; G06F 9/4443; G06F 3/04847; G06F 11/3664; G06F 3/012; G06F 3/0304; G06K 9/00664–9/00704; G06T 19/00; G06T 17/00; G06T 7/00; G06T 19/006; G06T 2215/16; H04N 5/272; H04N 2201/3245; A63F 13/10
See application file for complete search history.

(56) References Cited

U.S. PATENT DOCUMENTS

2015/0279103 A1\* 10/2015 Naegle ................ G01S 13/0209
345/633
2015/0371447 A1\* 12/2015 Yasutake ............... G06T 19/006
345/420
2020/0334910 A1\* 10/2020 Driancourt ................ G06T 7/50

FOREIGN PATENT DOCUMENTS

JP 2014-203175 10/2014

\* cited by examiner

*Primary Examiner* — Todd Buttram
(74) *Attorney, Agent, or Firm* — Greenblum & Bernstein, P.L.C.

(57) ABSTRACT

An AR space image projecting system is configured to: acquire a depth map of an area photographed by a photographing unit; specify at least one three-dimensional object existing in the area; receive designation of a projected image; receive a projection execution input in a state where the projected image is superimposed onto the three-dimensional object and the superimposed projected image is displayed; specify, when the projection execution input is received, onto what position of the three-dimensional object the projected image is projected, and register information on the projected image and information on a projected position so as to be associated with the three-dimensional object information; and superimpose the projected image on the three-dimensional object reflected on a display unit and display the three-dimensional object thus superimposed in a case where the three-dimensional object onto which the projected image is projected is photographed by the photographing unit.

4 Claims, 8 Drawing Sheets

ONE EXAMPLE OF PROJECTED IMAGE

ONE EXAMPLE OF OBJECTS THAT EXIST ACTUALLY

ONE EXAMPLE INDICATING STATE WHEN PROJECTION IS EXECUTED

ONE EXAMPLE INDICATING PROJECTION COMPLETED STATE

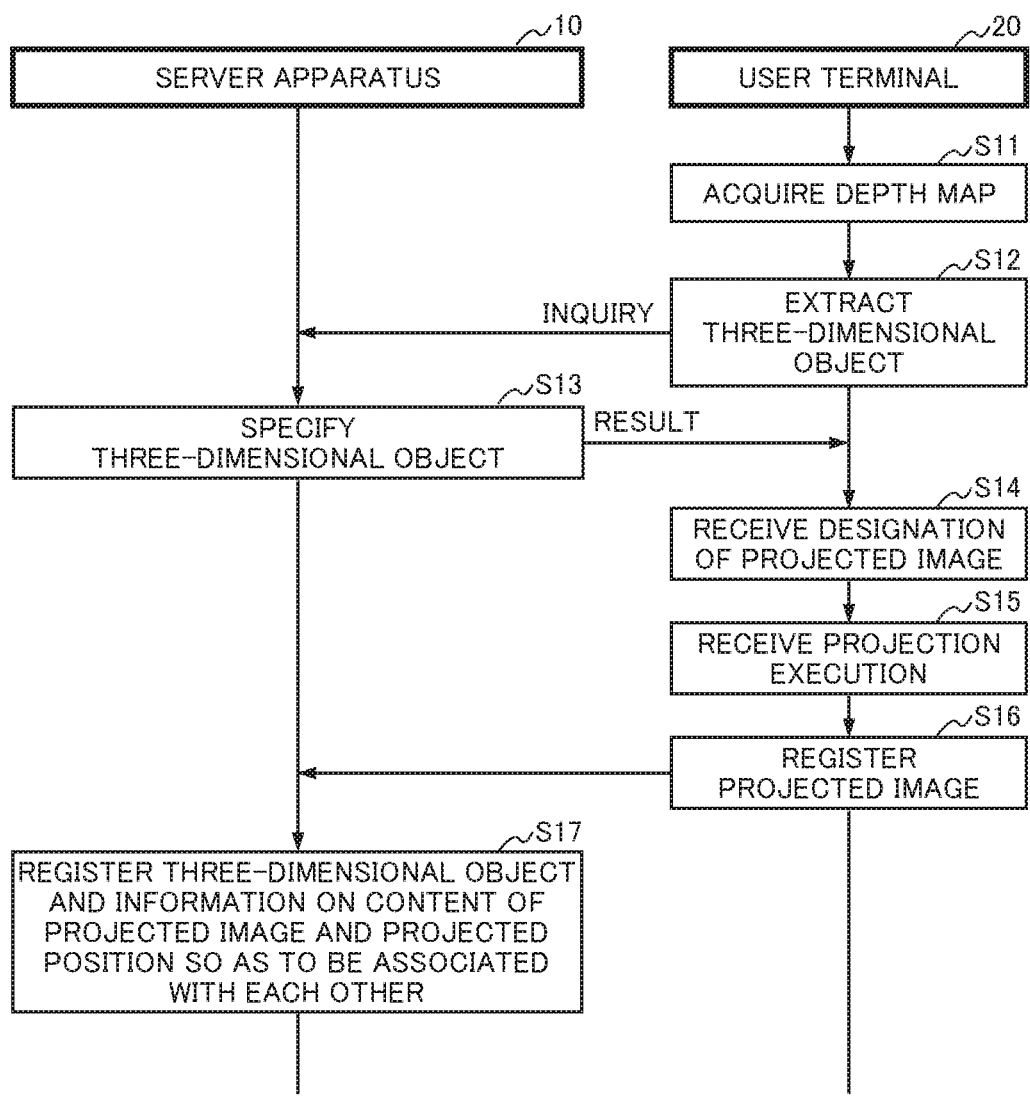

AR SPACE IMAGE PROJECTING SYSTEM, AR SPACE IMAGE PROJECTING METHOD, AND USER TERMINAL

CROSS-REFERENCE TO RELATED APPLICATION

The present application relates to subject matter contained in Japanese Patent Application No. 2019-079878 filed on Apr. 19, 2019, the disclosure of which is expressly incorporated herein by reference in its entirety.

BACKGROUND OF THE INVENTION

1. Field of the Invention

At least one of embodiments of the present invention relates to an AR space image system, an AR space image projecting method, and a user terminal capable of sharing an image obtained by virtually projecting the image onto a real object arranged in an actual world from a user terminal with a plurality of users by an augmented reality technique.

2. Description of the Related Art

In recent years, an augmented reality (AR) technology has started to be provided. Augmented reality is a technology for displaying a virtual object in a real space by superimposing a flat or stereoscopic onto an image in the real space and displaying the superimposed image.

Further, a technology for causing a plurality of users to share an object to be displayed by using the augmented reality technology has also been proposed. The technology for causing a plurality of users to share a virtual object is disclosed in JP2014-203175A (hereinafter, referred to as "Patent Document 1"), for example. Patent Document 1 discloses a technology for determining an appropriate position at which an object that a plurality of users desires to share can be easily viewed by all of these sharing users.

SUMMARY OF THE INVENTION

An information processing apparatus disclosed in Patent Document 1 is characterized in that a virtual object is arranged at a position that all of a plurality of users can view easily. However, the Patent Document 1 does not disclose a technique in which the plurality of users is allowed to share an image obtained by virtually projecting the image onto a real object arranged in an actual world from a user terminal by an augmented reality technique.

It is an object of at least one of embodiments of the present invention to provide an AR space image projecting system, an AR space image projecting method, and user terminal capable of sharing a projected image obtained by virtually projecting an image onto a real object arranged in an actual world from a user terminal with a plurality of users by means of an augmented reality technique.

According to one non-limiting aspect of the present invention, there is provided an AR space image projecting system including a server apparatus and one or more user terminals. The server apparatus is configured to store information on a plurality of three-dimensional objects. Each of the one or more user terminals includes a photographing unit and a display unit.

The AR space image projecting system includes a depth map acquiring unit configured to acquire a depth map of an area, the area being photographed by the photographing unit.

The AR space image projecting system also includes a three-dimensional object specifying unit configured to specify at least one three-dimensional object, the at least one three-dimensional object existing in the area photographed by the photographing unit.

The AR space image projecting system also includes a projected image designation receiving unit configured to receive designation of a projected image.

The AR space image projecting system also includes a projection execution receiving unit configured to receive a projection execution input in a state where the projected image is superimposed onto the three-dimensional object photographed by the photographing unit and the projected image thus superimposed is displayed on the display unit.

The AR space image projecting system also includes a projected image information registering unit configured to specify, when the projection execution input is received by the projection execution receiving unit, onto what position of the three-dimensional object the projected image is projected, and register information on the projected image and information on a projected position so as to be associated with the three-dimensional object information.

The AR space image projecting system also includes a projected image superimposed displaying unit configured to superimpose the projected image on the three-dimensional object reflected on the display unit of the user terminal and display the three-dimensional object thus superimposed in a case where the three-dimensional object onto which the projected image is projected is photographed by the photographing unit of the user terminal.

According to another non-limiting aspect of the present invention, there is provided an AR space image projecting method executed by a server apparatus and one or more user terminals. The server apparatus is configured to store information on a plurality of three-dimensional objects. Each of the one or more user terminals includes a photographing unit and a display unit.

The AR space image projecting method includes a depth map acquiring step of acquiring a depth map of an area, the area being photographed by the photographing unit.

The AR space image projecting method also includes a three-dimensional object specifying step of specifying at least one three-dimensional object, the at least one three-dimensional object existing in the area photographed by the photographing unit.

The AR space image projecting method also includes a projected image designation receiving step of receiving designation of a projected image.

The AR space image projecting method also includes a projection execution receiving step of receiving a projection execution input in a state where the projected image is superimposed onto the three-dimensional object photographed by the photographing unit and the projected image thus superimposed is displayed on the display unit.

The AR space image projecting method also includes a projected image information registering step of specifying, when the projection execution input is received in the projection execution receiving step, onto what position of the three-dimensional object the projected image is projected, and registering information on the projected image and information on a projected position so as to be associated with the three-dimensional object information.

The AR space image projecting method also includes a projected image superimposed displaying step of superimposing the projected image on the three-dimensional object reflected on the display unit of the user terminal and displaying the three-dimensional object thus superimposed in a case where the three-dimensional object onto which the projected image is projected is photographed by the photographing unit of the user terminal.

According to still another non-limiting aspect of the present invention, there is provided a user terminal for an AR space image projecting system. The AR space image projecting system includes: a server apparatus configured to store information on a plurality of three-dimensional objects; and one or more user terminals constituting the user terminal, each of the one or more user terminals including a photographing unit and a display unit.

The user terminal includes a depth map acquiring unit configured to acquire a depth map of an area, the area being photographed by the photographing unit.

The user terminal also includes a three-dimensional object specifying unit configured to specify at least one three-dimensional object, the at least one three-dimensional object existing in the area photographed by the photographing unit.

The user terminal also includes a projected image designation receiving unit configured to receive designation of a projected image.

The user terminal also includes a projection execution receiving unit configured to receive a projection execution input in a state where the projected image is superimposed onto the three-dimensional object photographed by the photographing unit and the projected image thus superimposed is displayed on the display unit.

The user terminal also includes a projected image information transmitting unit configured to transmit, when the projection execution input is received by the projection execution receiving unit, information on the projected image and information on a projected position to the server apparatus to cause the server apparatus to specify onto what position of the three-dimensional object the projected image is projected and register the information on the projected image and information on the projected position so as to be associated with the three-dimensional object information.

The user terminal also includes a projected image superimposed displaying unit configured to acquire the projected image information from the server apparatus in a case where the three-dimensional object onto which the projected image is projected is photographed by the photographing unit, the projected image superimposed displaying unit being configured to superimpose the projected image on the three-dimensional object reflected on the display unit and display the three-dimensional object thus superimposed.

According to each of the embodiments of the present application, one or two or more shortages are solved.

BRIEF DESCRIPTION OF DRAWINGS

The foregoing and other objects, features and advantages of the present invention will become more readily apparent from the following detailed description of preferred embodiments of the present invention that proceeds with reference to the appending drawings:

FIG. 7 is a flowchart illustrating an example of a projected image registering process corresponding to at least one of the embodiments of the present invention.

DETAILED DESCRIPTION OF THE INVENTION

Hereinafter, examples of embodiments according to the present invention will be described with reference to the drawings. Note that various components in the respective embodiments described below can be appropriately combined without any contradiction or the like. In addition, the description of the content described as a certain embodiment may be omitted in another embodiment. Further, the content of an operation or processing that does not relate to features of each of the embodiments may be omitted. Moreover, the order of various processes that constitute various flows described below may be changed without any contradiction or the like of processing content.

Figure 1:
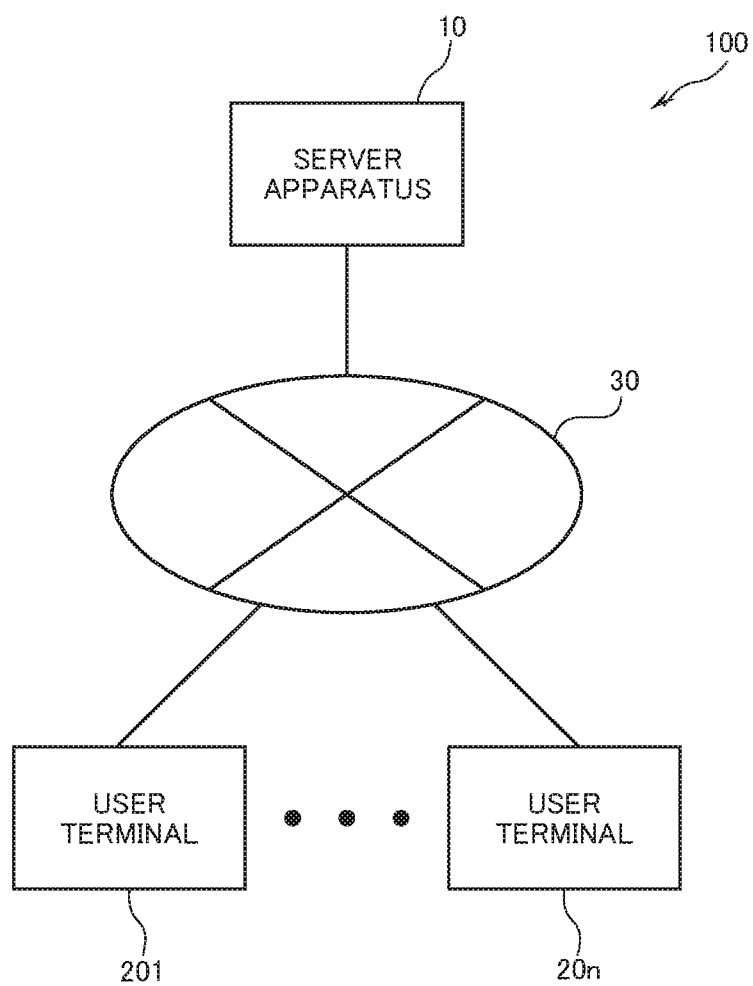
FIG. 1 is a block diagram illustrating an example of a configuration of an AR space image projecting system corresponding to at least one of the embodiments of the present invention.

FIG. 1 is a block diagram illustrating an example of a configuration of an AR space image projecting system 100 according to one embodiment of the present invention. As illustrated in FIG. 1, the AR space image projecting system 100 includes a server apparatus 10 and user terminals 201 to 20n ("n" is an arbitrary integer) respectively used by users of the AR space image projecting system. In this regard, the configuration of the AR space image projecting system 100 is not limited to this configuration, and the AR space image projecting system 100 may be configured so that a single user terminal is used by each of a plurality of users. In addition, the AR space image projecting system 100 may be configured so as to include a plurality of server apparatuses.

Each of the server apparatus 10 and the plurality of user terminals 201 to 20n is connected to a communication network 30 such as the Internet. In this regard, although it is not illustrated in the drawings, the plurality of user terminals 201 to 20n is connected to the communication network 30 by executing data communication with base stations managed by a telecommunication carrier by means of a radio communication line, for example.

The AR space image projecting system 100 includes the server apparatus 10 and the plurality of user terminals 201 to 20n, thereby realizing various kinds of functions to execute various kinds of processes in response to an operation of the user.

The server apparatus 10 is managed by an administrator of the AR space image projecting system 100, and has various kinds of functions to provide information regarding the various kinds of processes to each of the plurality of user terminals 201 to 20n. In the present embodiment, the server apparatus 10 is constructed by an information processing apparatus such as a WWW server, and includes a storage medium for storing various kinds of information. In this regard, the server apparatus 10 is provided with a general configuration for executing the various kinds of processes, such as a control unit or a communication unit, as a computer. However, its explanation herein is omitted. Further, in the AR space image projecting system 100, it is preferable that the server apparatus 10 manages various kinds of information from a point of view to reduce a processing load on each of the plurality of user terminals 201 to 20n. However, a storage unit for storing various kinds of information may include a storage region in a state that the server apparatus 10 can access the storage region. For example, the server apparatus 10 may be configured so as to be provided with a dedicated storage region outside the server apparatus 10.

Each of the plurality of user terminals 201 to 20n is managed by the user, and is configured by a communication terminal, such as a cellular phone terminal or a PDA (Personal Digital Assistants), for example. There is a need that each user terminal is configured so that a camera device for photographing a moving image or a still image by the user is mounted thereon and a display (or a display unit) for displaying photographed image data and the like is provided therein. As another example of the configuration of the user terminal, there are a so-called wearable divide such as a smartwatch, and a combination of the wearable divide and the communication terminal. Further, the camera device may be an optical camera, or may use a three-dimensional camera device together. Further, each of the user terminals 201 to 20n includes input means for inputting drawing information, such as a mouse, a touch panel, or a touch pen.

Further, each of the plurality of user terminals 201 to 20n is connected to the communication network 30, and includes hardware and software for executing various kinds of processes by communicating with the server apparatus 10. In this regard, each of the plurality of user terminals 201 to 20n may be configured so as to be capable of directly communicating with each other without the server apparatus 10.

In a process to execute information processing, the server apparatus 10 appropriately transmits a process stage to each of the user terminals 201 to 20n. Each of the user terminals 201 to 20n causes the display unit to display the screen content based on the content of the received process stage on a display screen. Generation of the screen content may be executed by the server apparatus 10, or may be executed by each of the user terminals 201 to 20n.

Figure 2:
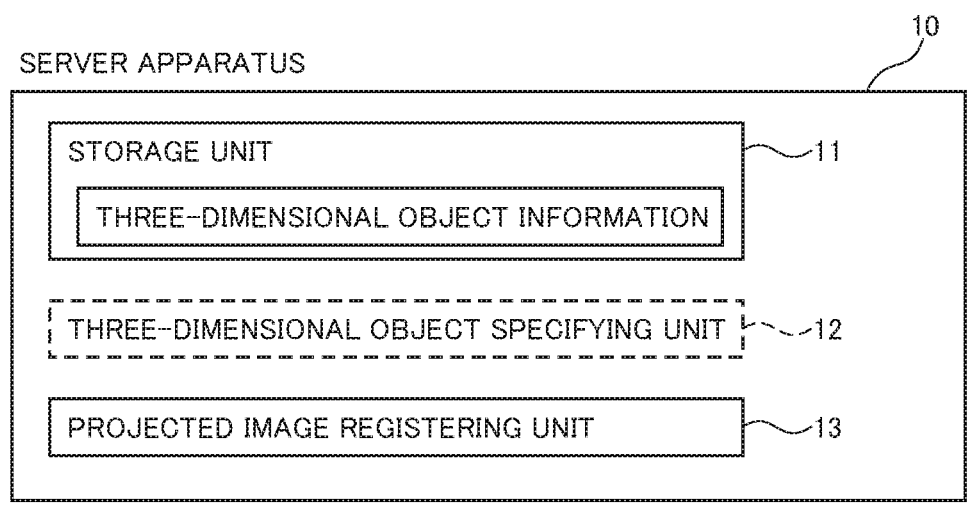
FIG. 2 is a block diagram illustrating a configuration of a server apparatus corresponding to at least one of the embodiments of the present invention.

FIG. 2 is a block diagram illustrating a configuration of the server apparatus 10 corresponding to at least one of the embodiments of the present invention. As illustrated in FIG. 2, the server apparatus 10 at least includes a storage unit 11, a three-dimensional object specifying unit 12, and a projected image registering unit 13.

The storage unit 11 has a function to store three-dimensional object information, which becomes a target of image projection, in the AR space image projecting system 100. Here, a three-dimensional object in the AR space image projecting system 100 means an object whose three-dimensional shape, size, posture state, and positional information (in case of a fixed object such as a building) are registered so that the user can grasp them. The three-dimensional shape, the size, the posture state, and the positional information (in case of a fixed object such as a building) are stored in this storage unit 11 for each of three-dimensional objects as the three-dimensional object information. Further, the projected image information (will be described later) is also stored in the storage unit 11 as the three-dimensional object information.

The three-dimensional object specifying unit 12 has a function to specify a three-dimensional object. In order to store a three-dimensional object photographed by a photographing unit of a user terminal 20 (will be described later) so as to be associated with a projected image to be projected onto the three-dimensional object, there is a need to uniquely specify a three-dimensional object and also uniquely specify a posture state thereof. For this reason, the three-dimensional object specifying unit 12 specifies a three-dimensional object in response to an inquiry from the user terminal 20, and transmits a specification result to the user terminal 20. Any means may be adopted so long as a three-dimensional object can be specified. For example, in case of a cube, there is a need to distinguish and recognize the cube form the other cubes. Further, since the cube is configured by six faces each having the same size, a configuration to distinguish and recognize each of the six faces from the other five faces is required. In this case, for example, it is thought that a first identification code for distinguishing a cube and a second identification code for distinguishing one face from the other five faces are arranged so that a posture state of the cube can be grasped even in a case where the cube is photographed from any direction. By using the first and second identification codes read by the user terminal 20, this three-dimensional object specifying unit 12 can specify a cube and a posture state thereof, whereby it is possible to specify a face or faces of the cube currently included in an area photographed by the photographing unit of the user terminal 20. Further, such means is not limited to the identification codes, and it is possible to utilize a marker, such as an AR marker, by which a cube and a face or faces thereof can be specified uniquely. In this regard, the three-dimensional object specifying unit 12 may be provided in the user terminal 20.

The projected image registering unit 13 has a function to register projected image information so as to be associated with the three-dimensional object information in a case where the user terminal 20 executes projection of a projected image. The projected image information is information on what kind of projected image is projected at what position of the three-dimensional object. The server apparatus 10 stores the three-dimensional object information in the storage unit 11. When the projected image information is transmitted from the user terminal 20, the server apparatus 10 registers and stores the projected image information so as to be associated with the three-dimensional object information.

Figure 3:
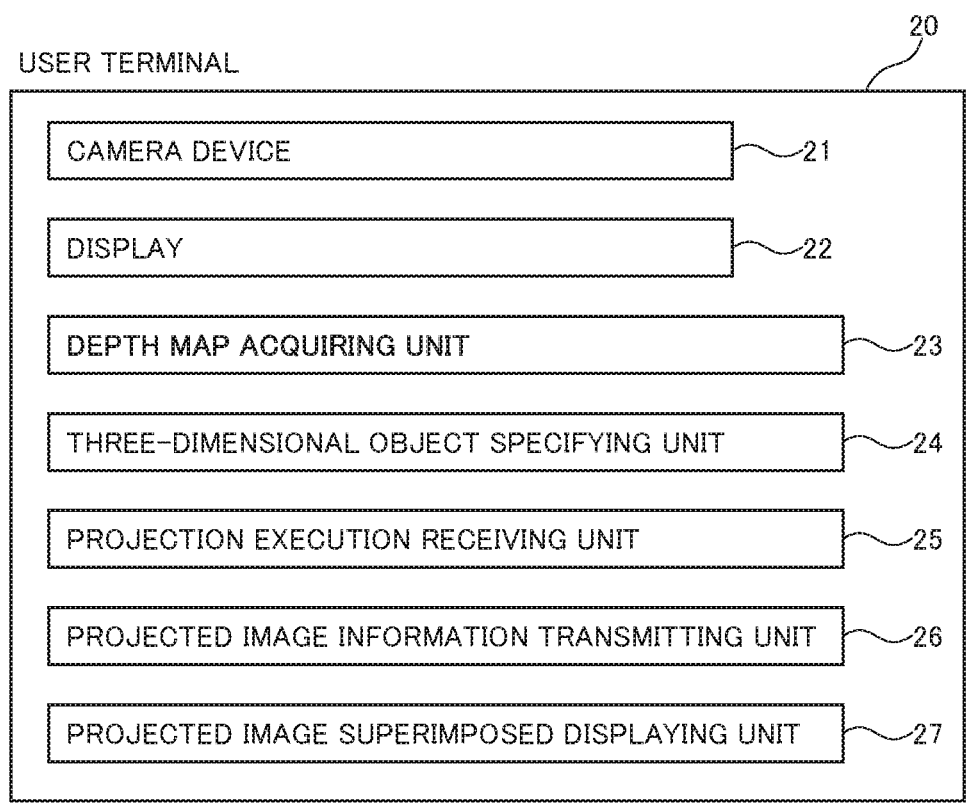
FIG. 3 is a block diagram illustrating a configuration of a user terminal corresponding to at least one of the embodiments of the present invention.

FIG. 3 is a block diagram illustrating a configuration of the user terminal 20 corresponding to at least one of the embodiments of the present invention. As illustrated in FIG. 3, the user terminal 20 includes a camera device 21 as the photographing unit, a display 22 as display unit, a depth map acquiring unit 23, a three-dimensional object specifying unit 24, a projection execution receiving unit 25, a projected image information transmitting unit 26, and a projected image superimposed displaying unit 27.

The camera device 21 has a function to photograph a status around the user. The camera device 21 as the photographing unit photographs the status around the user as a moving image (or video), and superimposes a virtual object on the photographed video to display the photographed video superimposed by the virtual object, thereby providing the user augmented reality (AR: Augmented Reality). Here, the virtual object means an object that is arranged in a virtual space. In the present embodiment, the virtual object contains a three-dimensional virtual object with the same size of a three-dimensional object that actually exists, a projected image to be displayed by being superimposed on a three-dimensional virtual object, and the like.

The display 22 has a function to display the video photographed by the photographing unit, and display a display screen on which the virtual object is superimposed onto the video. Thus, the AR is realized via the display 22 as the display unit.

The depth map acquiring unit 23 has a function to acquire a depth map of an area photographed by the photographing unit. Here, the depth map means a map regarding a depth that is generated by comprehensively acquiring depths (or distances) to various objects including three-dimensional objects existing in a real space. The depth map acquiring unit 23 may be any means so long as the depth map can be acquired. As one example, there are depth acquisition by a TOF (time-of-flight) system using light such as a laser beam, depth acquisition by a stereoscopic camera using two cameras, and depth acquisition using two or more different frames of video acquired by one camera. Specifically, this depth map acquiring unit 23 acquires a depth to a three-dimensional object projected into an area photographed by the camera device 21.

The three-dimensional object specifying unit 24 has a function to use the three-dimensional object specifying unit 12 to specify at least one three-dimensional object that exists in the area photographed by the photographing unit. As described above, the three-dimensional object specifying unit 12 specifies the three-dimensional object. However, there is a need to execute a process to inquire the three-dimensional object reflected into the area of the photographed video by this three-dimensional object specifying unit 24. Inquiry about the three-dimensional object is executed by using an identification code or an AR marker reflected onto the photographed video, for example. Further, in a case where real estate such as a building or a fixed object is a three-dimensional object, there is a possibility that the three-dimensional object can be specified by positional information of the user terminal 20 and information on a photographing direction. For this reason, the inquiry of the three-dimensional object may also be executed by using the positional information of the user terminal 20 and the information on the photographing direction. As a result of the inquiry, in a case where the three-dimensional object specifying unit 12 of the server apparatus 10 can uniquely specify the three-dimensional object, the server apparatus 10 transmits information on the specified three-dimensional object to the user terminal 20, and the three-dimensional object specifying unit 24 of the user terminal 20 specifies the three-dimensional object.

The projection execution receiving unit 25 has a function to receive a projection execution input in a state where a projected image is superimposed onto the three-dimensional object photographed by the photographing unit and the projected image thus superimposed is displayed on the display unit. In a state where the user selects the projected image and the display 22 as the display unit is caused to display the projected image thus selected by the user, the user terminal 20 becomes a mode to photograph by the camera device 21. A status that a three-dimensional object existing in a photographed area is reflected onto photographed video of the camera device 21 may occur. Namely, the projected image is superimposed and displayed onto the three-dimensional object. In such a status, the user carries out adjustment, such as change in a photographing direction, adjustment of a distance to the three-dimensional object by a zoom function, or adjustment of a display size of the projected image, so as to become a status that the projected image with any size is superimposed and displayed onto a given portion of the three-dimensional object. When the user carries out a projection execution input in a status that the adjustment is completed, the projection execution input is received. As an example of the projection execution input, it is thought an input to tap a projected image displayed on the display screen, for example.

The projected image information transmitting unit 26 has a function to specify, when the projection execution input is made, onto what position of the three-dimensional object the projected image is projected, and transmit, to the server apparatus 10, information on the projected image and information on the projected position so as to be able to associated with the three-dimensional object information. Projection of the projected image is executed on the basis of a system defined in advance. For example, it is thought a process to maintain a superimposing relationship on the display screen as it is and paste a projected image to a three-dimensional object so that appearance on photographed video is the same between that before projection and that after projection. Further, in a case where a projected image is projected onto two or more objects so as to across them, a process to divide the projected image into two portions and paste an image of a corresponding portion to each of the objects is executed. For the division of the projected image, a process to extract a boundary portion at which a depth in a depth map changes as a dividing portion is thought. Further, in a case where a face on which a three-dimensional object is projected does not confront the camera device 21 and has an angle therewith, the projected image is projected onto positions each of which has a different distance from each other with respect to a near side and a back side. Therefore, in a case where the projected image is projected accurately, the projected image, which becomes a deformed image when the projected surface is viewed from a front face thereof, is to be pasted thereon. Thus, the projected image information transmitting unit 26 may be configured so as to project the projected image that becomes a normal aspect ratio only when viewed from a projection angle at the time of projection, or may be configured so as to project the projected image so that the projected image is pasted on a surface of the three-dimensional object from the front face thereof.

Further, means for specifying how the projected image is projected onto the three-dimensional may be any means. However, for example, a three-dimensional virtual object model may be arranged so as to overlap a real three-dimensional object, and such means may specify it as projection of the projected image onto the three-dimensional virtual object model.

The projected image superimposed displaying unit 27 has a function to superimpose the projected image on the three-dimensional object reflected on the display unit of the user terminal 20 and display the three-dimensional object thus superimposed in a case where the three-dimensional object onto which the projected image is projected is photographed by the photographing unit of the user terminal 20. The three-dimensional object information and the projected image information are stored in the server apparatus 10 so as to be associated with each other. Thus, in a case where the three-dimensional object is photographed by the photographing unit of the user terminal 20, it is possible to specify whether the projected image information is associated with the three-dimensional object information or not by inquiring the server apparatus 10 of the three-dimensional object. In a case where the projected image information is associated with the three-dimensional object information, the projected image information is acquired in the user terminal 20, and the projected image associated with the three-dimensional object is superimposed onto the three-dimensional object reflected on the display 22 as the display unit and displayed on the display 22. This is not limited to the user terminal 20 in which the projected image is associated with the three-dimensional object. In each of the other user terminals, in a case where the projected image information is associated with the three-dimensional object information, the projected image associated with the three-dimensional object is superimposed onto the three-dimensional object and displayed on a display unit thereof. This makes it possible to share the projected image with the other users.

Figure 4A:
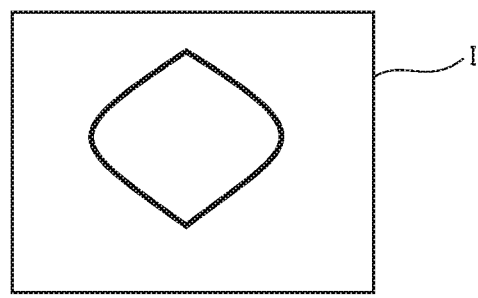
FIGS. 4A-4C are explanatory drawings for explaining a concept of image projection in the AR space image projecting system corresponding to at least one of the embodiments of the present invention.
Figure 4B:
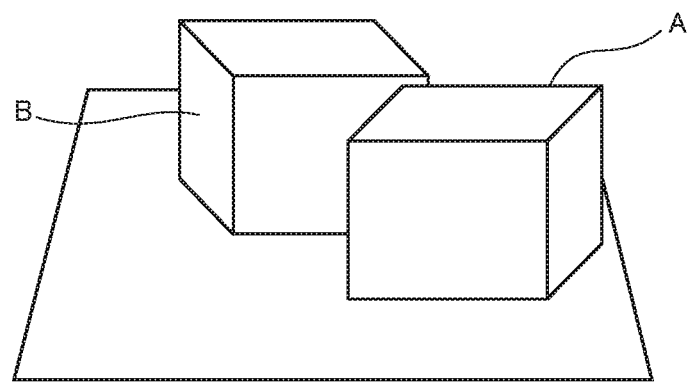
Figure 4C:
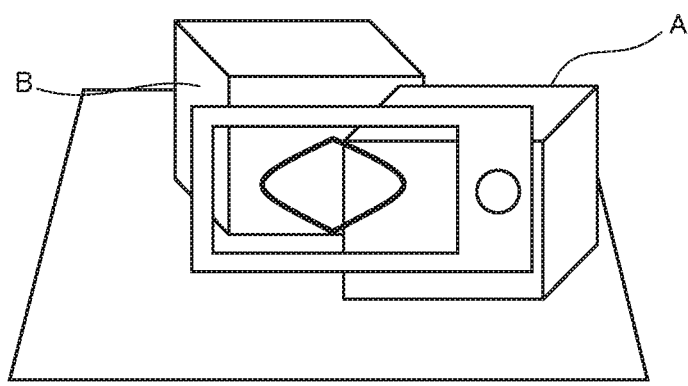
Figure 5A:
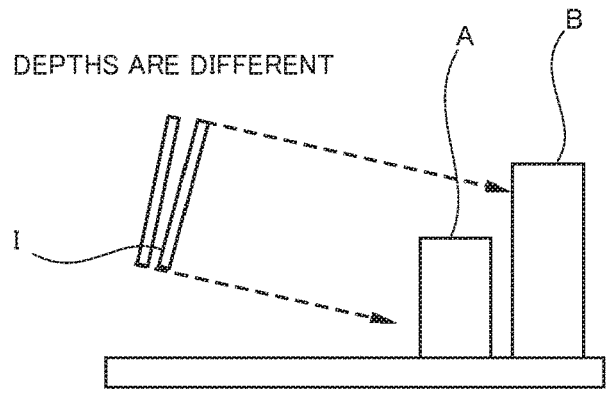
FIGS. 5A-5C are explanatory drawings for explaining another concept of the image projection in the AR space image projecting system corresponding to at least one of the embodiments of the present invention.
Figure 5B:
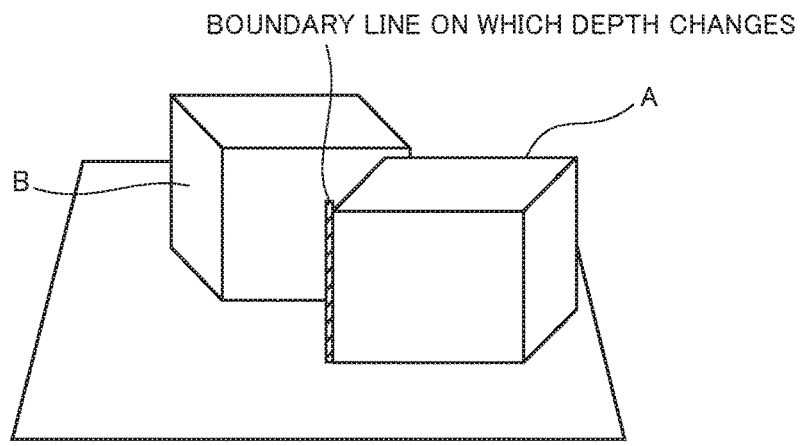

FIG. 4 to FIG. 6 are explanatory drawings for explaining a concept of image projection in the AR space image projecting system corresponding to at least one of the embodiments of the present invention. In a case where image projection is executed by using the AR space image projecting system 100, the user first selects a projected image I as illustrated in FIG. 4A. Next, as illustrated in FIG. 4B, three-dimensional objects A and B actually exist in the vicinity of the user. At this time, in order for the user to carry out image projection by using the AR space image projecting system 100, the user first photographs the three-dimensional objects A and B by means of the camera device 21 by using a dedicated application for utilizing the AR space image projecting system 100; causes the projected image I to be superimposed and displayed on the display screen; and generates a status where a projection execution input can be carried out. FIG. 4C is one example indicating a state when the projection execution input is executed.

Figure 5C:
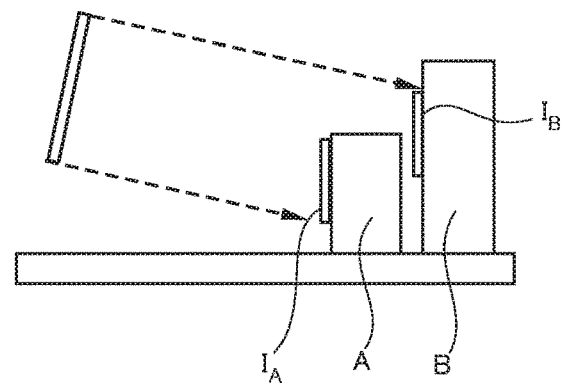

When projection is carried out in the status illustrated in FIG. 4C, the projected image I is projected onto the two three-dimensional objects A and B so as to across them. At this time, as illustrated in FIG. 5A, depths to the three-dimensional objects A and B from the user terminal 20 are different from each other. Thus, as illustrated in FIG. 5C, the depths largely vary in a boundary portion between the two three-dimensional objects A and B. Therefore, the projected image I is divided into two portions by a boundary line via which these depths largely vary. When the projected image I is divided and projection thereof is executed, as illustrated in FIG. 5C, a projected image $I_A$ and a projected image $I_B$ are respectively projected to the three-dimensional object A and the three-dimensional object B.

Figure 6A:
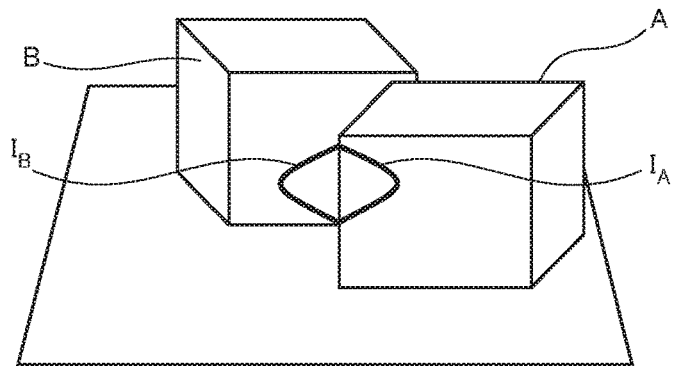
FIGS. 6A-6C are explanatory drawings for explaining still another concept of the image projection in the AR space image projecting system corresponding to at least one of the embodiments of the present invention.
Figure 6B:
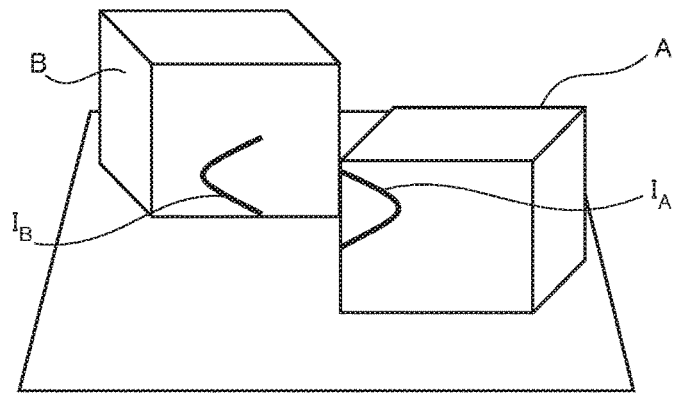
Figure 6C:
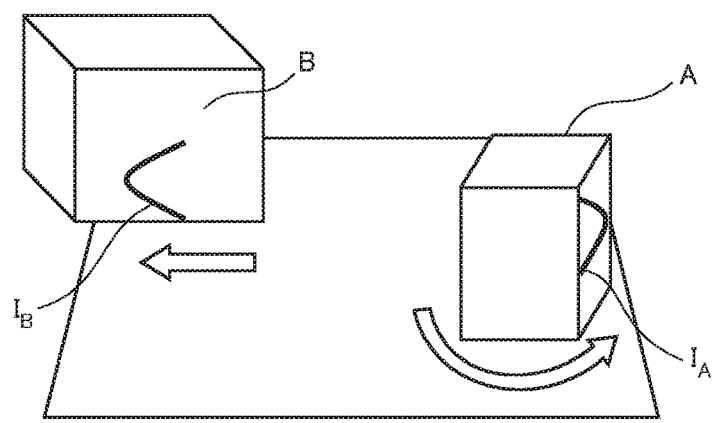

FIG. 6A indicates a state where projection of the projected images $I_A$ and $I_B$ to the three-dimensional objects A and B is completed. In a case where the projection is completed, as illustrated in FIG. 6B, a positional relation between the three-dimensional objects A and B may change. In such a case, so long as a posture state of each of the three-dimensional objects A and B can be grasped, the projected image always maintains a state where the projected images $I_A$ and $I_B$ are respectively projected onto initial projected positions. By utilizing such a configuration, as illustrated in FIG. 6C, it is also possible to utilize the AR space image projecting system 100 as a puzzle game in which a correct positional relation of image projection in an AR space is searched. Further, at this time, a relatively positional relation between the user terminal 20 and the three-dimensional objects A and B at the time of projection may also be registered in the server apparatus 10 as the projected image information. In such a case, it is possible to adopt an action to guess the relatively positional relation when the projection is executed as a part of the puzzle game.

Next, a flow of a projected image registering process executed by the AR space image projecting system 100 according to the present embodiment will be described. FIG. 7 is a flowchart illustrating an example of the projected image registering process corresponding to at least one of the embodiments of the present invention. Hereinafter, a case where the server apparatus 10 and the user terminal 20 execute the projected image registering process will be described as an example.

As illustrated in FIG. 7, the projected image registering process is first started when the user terminal 20 acquires a depth map (Step S11). Next, the user terminal 20 extracts a three-dimensional object reflected on photographed video photographed by the camera device 21, and executes an inquiring process to the server apparatus 10 (Step S12). The server apparatus 10 specifies the three-dimensional object by using information given at the time of inquiry, and transmits a specification result to the user terminal 20 (Step S13). Next, the user terminal 20 receives designation of a projected image by the user, superimposes the projected image onto the photographed image and displays the projected image superimposed onto the photographed image on the display screen (Step S14). The user terminal 20 then receives a projection execution input by the user (Step S15). When the projection is executed, a projected position of the projected image against the three-dimensional object is determined. Therefore, the user terminal 20 transmits information on this projected position and the like to the server apparatus 10 in order to register the information on this projected position as the projected image information together with information on the content of the projected image itself (Step S16). The server apparatus 10 registers and stores information on the content of the projected image and information on the projected position as the projected image information so as to be associated with the three-dimensional object information (Step S17), and terminates the projected image registering process.

Figure 8:
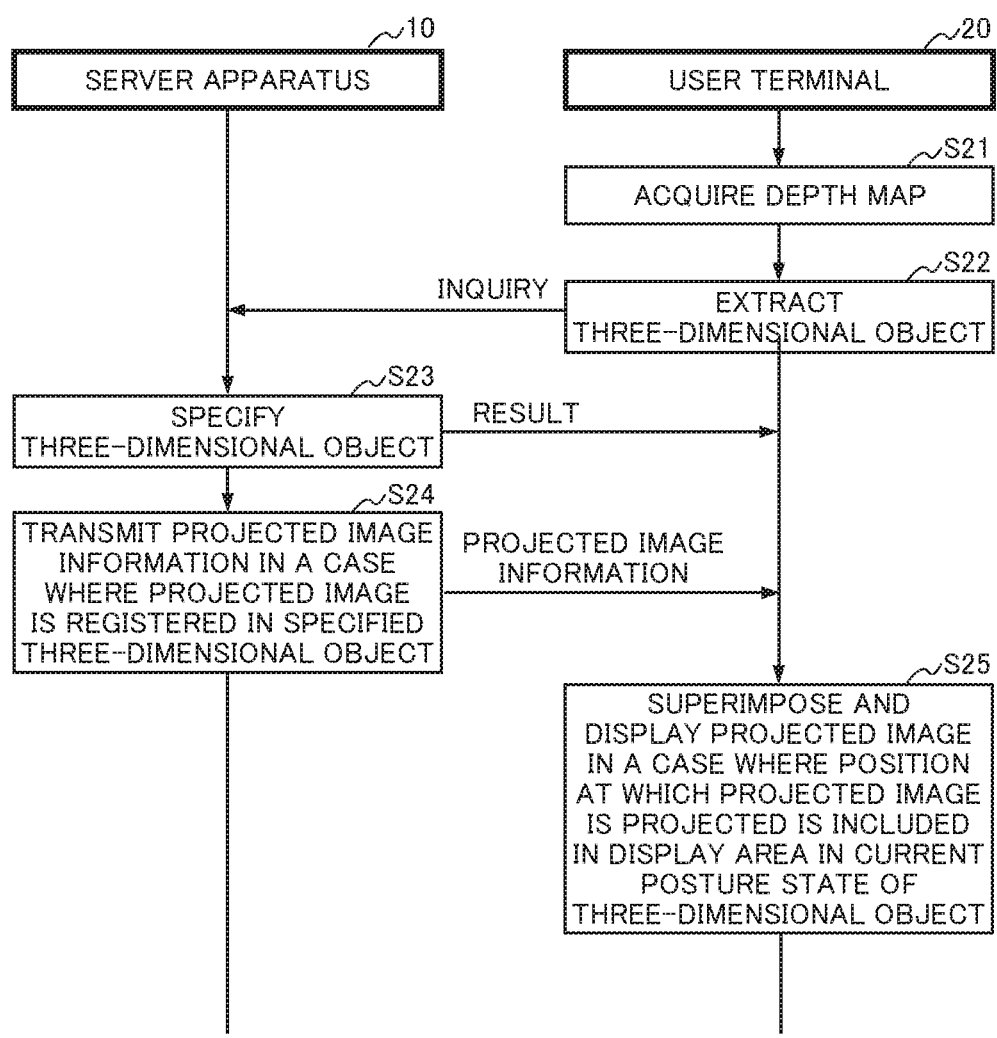
FIG. 8 is a flowchart illustrating an example of a projected image superimposed displaying process corresponding to at least one of the embodiments of the present invention.

Next, a flow of a projected image superimposed displaying process executed by the AR space image projecting system 100 according to the present embodiment will be described. FIG. 8 is a flowchart illustrating an example of the projected image superimposed displaying process corresponding to at least one of the embodiments of the present invention. Hereinafter, a case where the server apparatus 10 and the user terminal 20 execute the projected image registering process will be described as an example.

As illustrated in FIG. 8, the user terminal 20 first acquires a depth map, whereby the projected image superimposed displaying process is started (Step S21). Next, the user terminal 20 extracts a three-dimensional object reflected on photographed video photographed by the camera device 21, and executes an inquiring process to the server apparatus 10 (Step S22). The server apparatus 10 specifies the three-dimensional object by using information given at the time of inquiry, and transmits a specification result to the user terminal 20 (Step S23). Further, in a case where the projected image information is registered so as to be associated with the specified three-dimensional object, the server apparatus 10 transmits the projected image information registered so as to be associated with the specified three-dimensional object to the user terminal 20 (Step S24). The user terminal 20 specifies a current posture state of the three-dimensional object, and determines whether a portion on which the projected image is projected is included in a display area in the current posture state or not. In a case where it is determined that the portion is included in the display area, the user terminal 20 superimposes the projected image at the projected position of the three-dimensional object and displays the projected image superimposed onto the three-dimensional object (Step S25), and terminates the projected image superimposed displaying process.

As described above, according to the AR space image projecting system 100 of the present embodiment, the depth map acquiring unit 23 acquires the depth map of the area photographed by the photographing unit; the three-dimensional object specifying unit 24 specifies at least one three-dimensional object that exists in the area photographed by the photographing unit; the projected image designation receiving unit (see Step S14) receives designation of the projected image; the projection execution receiving unit 25 receives the projection execution input in a state where the projected image is superimposed onto the three-dimensional object photographed by the photographing unit and the projected image thus superimposed is displayed on the display unit; the projected image information registering unit (see Step S17) specifies, when the projection execution input is received by the projection execution receiving unit, onto what position of the three-dimensional object the projected image is projected, and register information on the projected image and information on a projected position so as to be associated with the three-dimensional object information; the projected image superimposed displaying unit 27 superimposes the projected image on the three-dimensional object reflected on the display unit of the user terminal 20 and displays the three-dimensional object thus superimposed in a case where the three-dimensional object onto which the projected image is projected is photographed by the photographing unit of the user terminal 20. Therefore, it is possible to share the projected image virtually projected from the user terminal 20 onto a real object arranged in an actual world with a plurality of users by means of the augmented reality technique.

As described above, according to the first embodiment of the present application, one or two or more shortages are solved. Note that the effects of the first embodiment are not restrictive and are one example of the effects.

What is claimed is:

1. An AR space image projecting system, comprising:
a server apparatus that stores information on a plurality of three-dimensional objects; and
at least one user terminal, with each user terminal including a camera and a display,
wherein the user terminal is configured to acquire a depth map of an area, the area being photographed by the camera;
at least one of the server apparatus or the user terminal is configured to specify at least two three-dimensional objects, the at least two three-dimensional objects existing in the area photographed by the camera;
the user terminal is configured to receive designation of a projected image;
the user terminal is configured to receive a projection execution input in a state where the projected image is superimposed across the two three-dimensional objects photographed by the camera and the projected image thus superimposed is displayed on the display, the projected image being divided into at least two portions across the two three-dimensional objects;
the server apparatus is configured to specify, when the projection execution input is received by the user terminal, onto what initial positions of the two three-dimensional objects the two portions of the projected image are projected, and register information on the two portions of the projected image and information on the initial positions so as to be associated with information on the two three-dimensional objects; and the user terminal is configured to superimpose the two portions of the projected image on the two three-dimensional objects reflected on the display of the user terminal and display the two portions of the projected image thus superimposed in a case where the two three-dimensional objects onto which the two portions of the projected image are superimposed are photographed by the camera of the user terminal, the two portions of the projected image being superimposed on the two three-dimensional objects at the initial positions in a case where a positional relation between the two three-dimensional objects changes.

2. The AR space image projecting system according to claim 1, wherein the server apparatus is also configured to register, as the information on the projected image, a relatively positional relation between the user terminal and the two three-dimensional objects when the projection is executed.

3. An AR space image projecting method executed by a server apparatus and at least one user terminal, the server apparatus storing information on a plurality of three-dimensional objects, each user terminal including a camera and a display, the AR space image projecting method comprising:
acquiring a depth map of an area, the area being photographed by the camera;
specifying at least two three-dimensional objects, the at least two three-dimensional objects existing in the area photographed by the camera;
receiving designation of a projected image;
receiving a projection execution input in a state where the projected image is superimposed across the two three-dimensional objects photographed by the camera and the projected image thus superimposed is displayed on the display, the projected image being divided into at least two portions across the two three-dimensional objects;
specifying, when the projection execution input is received, onto what initial positions of the two three-dimensional objects the two portions of the projected image are projected, and registering information on the two portions of the projected image and information on the initial positions so as to be associated with information on the two three-dimensional objects; and
superimposing the two portions of the projected image on the two three-dimensional objects reflected on the display of the user terminal and displaying the two portions of the projected image thus superimposed in a case where the two three-dimensional objects onto which the two portions of the projected image are superimposed are photographed by the camera of the user terminal, the two portions of the projected image being superimposed on the two three-dimensional objects at the initial positions in a case where a positional relation between the two three-dimensional objects changes.

4. A user terminal for an AR space image projecting system, the AR space image projecting system including
a server apparatus configured to store information on a plurality of three-dimensional objects, and
one or more user terminals, the one or more user terminals including the user terminal, each of the one or more user terminals including a camera and a display,
the user terminal configured to:
acquire a depth map of an area, the area being photographed by the camera;

a specify at least two three-dimensional objects, the at least two three-dimensional objects existing in the area photographed by the camera;

to receive designation of a projected image;

receive a projection execution input in a state where the projected image is superimposed across the two three-dimensional objects photographed by the camera and the projected image thus superimposed is displayed on the display, the projected image being divided into at least two portions across the two three-dimensional objects;

transmit, when the projection execution input is received, information on the two portions of the projected image and information on projected positions to the server apparatus to cause the server apparatus to specify onto what initial positions of the two three-dimensional objects the two portions of the projected image are projected and register the information on the two portions of the projected image and information on the initial positions so as to be associated with information of the two three-dimensional objects; and acquire projected image information from the server apparatus in a case where the two three-dimensional objects onto which the two portions of the projected image are superimposed are photographed by the camera, the user terminal being configured to superimpose the two portions of the projected image on the two three-dimensional objects reflected on the display and display the two portions of the projected image thus superimposed, the two portions of the projected image being superimposed on the two three-dimensional objects at the initial positions in a case where a positional relation between the two three-dimensional objects changes.

* * * * *

UNITED STATES PATENT AND TRADEMARK OFFICE
CERTIFICATE OF CORRECTION

| | |
|---|---|
| PATENT NO. | : 11,238,658 B2 |
| APPLICATION NO. | : 16/851310 |
| DATED | : February 1, 2022 |
| INVENTOR(S) | : R. Driancourt |

It is certified that error appears in the above-identified patent and that said Letters Patent is hereby corrected as shown below:

In the Claims

Column 13, Line 1 (Claim 4, Line 11) please change "a specify" to --specify--

Column 13, Line 4 (Claim 4, Line 14) please change "to receive" to --receive--

Signed and Sealed this
Seventh Day of June, 2022

Katherine Kelly Vidal
*Director of the United States Patent and Trademark Office*